W. P. Hopkins,

Caliper.

No. 110,657.   Patented Jan. 3, 1871.

Witnesses:
A. W. Almqvist
S. S. Mabee

Inventor:
W. P. Hopkins
per Munn & Co
Attorneys.

United States Patent Office.

WILLIAM P. HOPKINS, OF LAWRENCE, MASSACHUSETTS.

Letters Patent No. 110,657, dated January 3, 1871.

IMPROVEMENT IN CALIPERS.

The Schedule referred to in these Letters Patent and making part of the same.

*To all whom it may concern:*

Be it known that I, WILLIAM P. HOPKINS, of Lawrence, in the county of Essex and State of Massachusetts, have invented a new and useful Improvement in Calipers; and I do hereby declare that the following is a full, clear, and exact description thereof, which will enable others skilled in the art to make and use the same, reference being had to the accompanying drawing forming part of this specification.

This invention relates to improvement in calipers; and consists in the arrangement of parts composing a friction-nut for holding the legs of the calipers at any desired angle to each other, as hereinafter described.

Similar letters of reference indicate corresponding parts.

Figure 1:
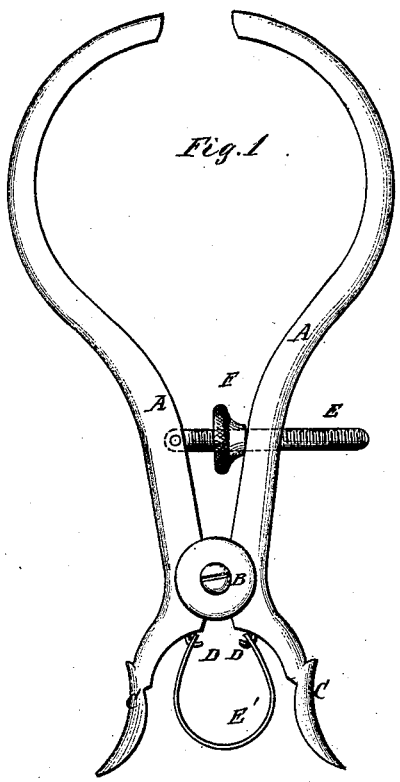
Figure 1 is a plan view of my improved calipers.
Figure 2:
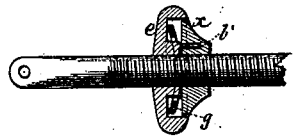
Figure 2 is a side view of a part of the adjusting-screw and a section of the nut.

A represents the legs of the calipers. They are jointed together at B, and may have thumb-projections, C, behind the joint B, or not, as preferred.

Behind the joint, and closed thereto, they have hooks, D, to which a spring, E', is connected for forcing the jaws together.

E is the adjusting-screw; and

F, the adjusting-nut.

Instead of arranging the nut to force the legs together, and the spring to force them apart, as heretofore, I reverse the order of the arrangement, using the nut to force them apart and the spring to force them together, whereby the calipers, while retaining all their former useful qualities, are made capable of reaching over thick outside rims, flanges, or other enlargement, and gauging thinner places beyond, which could not be done as heretofore arranged.

To accomplish this the legs are opened against the spring to pass over the thick place; the nut F is then adjusted to let the points down upon the surfaces of the thin place; then the points are forced open to pass back over the thick place, and then let back against the nut, which holds them the same as when the adjustment was established.

Instead of the arrangement of the screw E and nut F, as here shown, I may arrange the screw E to screw through one leg against the other, but I prefer this arrangement.

The friction-nut is composed of two disks, $e f$, the one having a recess or socket in one face, in which is placed a disk of spring metal or other springing substance, $g$, and the recess may receive the other disk $f$ also, to some extent; both disks are connected together by a pin, $h$, causing them to turn together.

The spring forces the disks in opposite directions against the side walls of the thread of the screw, so as to bind and produce the required friction.

This nut is also applicable to other uses.

The holes in the end of the spring E' are drilled, previous to tempering it, so as not to strain and check the metal, whereby it will be liable to break afterward, and the arrangement of the hooks by which it is attached is such that in case it does break another can be readily put on.

Having thus described my invention,

I claim as new and desire to secure by Letters Patent—

The improved friction-nut, consisting of the disks $e f$, screw $g$, and the locking-pin $h$, all combined and arranged substantially as specified.

WILLIAM P. HOPKINS.

Witnesses:
A. H. EAMES,
O. K. CURRIER.